United States Patent
Liu et al.

(10) Patent No.: US 10,834,318 B2
(45) Date of Patent: Nov. 10, 2020

(54) AUTOMATIC PHOTOGRAPHING METHOD AND TERMINAL BASED ON USE POSTURE

(71) Applicant: HUAWEI TECHNOLOGIES CO., LTD., Shenzhen (CN)

(72) Inventors: Haibo Liu, Shenzhen (CN); Yibing Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/085,587

(22) PCT Filed: Sep. 14, 2016

(86) PCT No.: PCT/CN2016/099125
§ 371 (c)(1),
(2) Date: Sep. 16, 2018

(87) PCT Pub. No.: WO2018/049630
PCT Pub. Date: Mar. 22, 2018

(65) Prior Publication Data
US 2019/0199924 A1 Jun. 27, 2019

(51) Int. Cl.
*H04N 5/232* (2006.01)
*G06F 1/16* (2006.01)
(Continued)

(52) U.S. Cl.
CPC ....... *H04N 5/23245* (2013.01); *G06F 1/1686* (2013.01); *G06F 1/1694* (2013.01);
(Continued)

(58) Field of Classification Search
CPC .. H04N 1/00; H04N 5/23245; H04N 5/23216; H04N 5/232; H04N 5/23293;
(Continued)

(56) References Cited

U.S. PATENT DOCUMENTS

| | | | |
|---|---|---|---|
| 9,374,521 B1 | 6/2016 | Brauer et al. | |
| 2004/0130658 A1 | 7/2004 | Yamaguchi et al. | |

(Continued)

FOREIGN PATENT DOCUMENTS

| | | | |
|---|---|---|---|
| CN | 1509046 A | 6/2004 | |
| CN | 103049209 A | 4/2013 | |

(Continued)

*Primary Examiner* — Hung H Lam

(57) ABSTRACT

The present invention relates to photographing technologies of terminals, and provides a photographing method and a terminal, so as to resolve an existing problem of complex operations when a user photographs. The method is applied to a mobile terminal equipped with at least one camera, and includes: determining, by the mobile terminal, whether the mobile terminal meets a preset condition, where the preset condition may include matching of a posture feature of the mobile terminal with a standard posture feature that is used to represent a posture feature of the mobile terminal when a user uses a first camera to photograph; and if the mobile terminal determines that the mobile terminal meets the preset condition, starting the first camera to photograph.

14 Claims, 9 Drawing Sheets

(51) Int. Cl.
*H04N 5/225* (2006.01)
*H04N 1/00* (2006.01)

(52) U.S. Cl.
CPC ......... *H04N 5/232* (2013.01); *H04N 5/23216* (2013.01); *H04N 5/23293* (2013.01); *H04N 5/232933* (2018.08); *H04N 1/00* (2013.01); *H04N 5/2258* (2013.01)

(58) Field of Classification Search
CPC ............ H04N 5/232933; H04N 5/2258; G06F 1/1694; G06F 1/1686
See application file for complete search history.

(56) References Cited

U.S. PATENT DOCUMENTS

| | | | | |
|---|---|---|---|---|
| 2008/0284858 | A1* | 11/2008 | Sasaki | H04N 5/144 348/208.1 |
| 2014/0118256 | A1 | 5/2014 | Sonoda et al. | |
| 2014/0232633 | A1 | 8/2014 | Shultz | |
| 2014/0253742 | A1 | 9/2014 | Ishii et al. | |
| 2015/0084984 | A1 | 3/2015 | Tomii et al. | |
| 2015/0189178 | A1* | 7/2015 | Lombardi | H04N 5/2258 348/207.99 |
| 2015/0229849 | A1 | 8/2015 | Shin | |
| 2016/0191790 | A1* | 6/2016 | Wang | H04N 5/23216 348/333.01 |
| 2016/0219217 | A1* | 7/2016 | Williams | H04N 5/23293 |

FOREIGN PATENT DOCUMENTS

| | | |
|---|---|---|
| CN | 103051795 A | 4/2013 |
| CN | 103079036 A | 5/2013 |
| CN | 104049981 A | 9/2014 |
| CN | 104243829 A | 12/2014 |
| CN | 104247393 A | 12/2014 |
| CN | 104539838 A | 4/2015 |
| CN | 104580884 A | 4/2015 |
| CN | 104598024 A | 5/2015 |
| CN | 104902186 A | 9/2015 |
| CN | 105162963 A | 12/2015 |
| CN | 105426095 A | 3/2016 |
| CN | 105578007 A | 5/2016 |
| CN | 105607838 A | 5/2016 |
| CN | 105981365 A | 9/2016 |
| WO | 2011098899 A1 | 8/2011 |

* cited by examiner

| After a processor of a mobile phone detects that the mobile phone is powered on, the processor of the mobile phone automatically enables a photographing function in the mobile phone provided in the present invention, and sends an enabling command to a sensor of the mobile phone; and the sensor of the mobile phone performs real-time detection based on the enabling command; alternatively, after receiving an operation that is used to enable a photographing function provided in the present invention and that is sent by the user, the processor of the mobile phone enables the photographing function in the mobile phone provided in the present invention, and sends an enabling command to a sensor of the mobile phone; and the sensor of the mobile phone performs real-time detection based on the enabling command | 101 |

↓

| A gravity sensor in the mobile phone sensor detects in real time an acceleration and a moving distance of the mobile phone in each direction; a capacitive touch sensor detects in real time a quantity of fingers and a fingerprint shape when the user holds the mobile phone; and each sensor transmits in real time a detection result to the processor of the mobile phone | 102 |

↓

| The processor of the mobile phone receives the detection result sent by each sensor; the processor of the mobile phone determines, based on the quantity of fingers and the fingerprint shape when the user holds the mobile phone in the detection result, that a manner in which the user holds the mobile phone is a vertical hold, and determines, based on the acceleration and the moving distance of the mobile phone in each direction in the detection result, that an angle at which the user views the display screen of the mobile terminal is a bottom view; and the processor of the mobile phone matches the posture feature of the vertical hold and the bottom view with a standard posture feature, and determines that the posture feature of the mobile phone matches the standard posture feature | 103 |

↓

| The processor of the mobile phone starts a front-facing camera to photograph | 104 |

FIG. 3

| After a processor of a mobile phone detects that the mobile phone is powered on, the processor of the mobile phone automatically enables a photographing function in the mobile phone provided in the present invention, and sends an enabling command to a sensor of the mobile phone; and the sensor of the mobile phone performs real-time detection based on the enabling command; alternatively, after receiving an operation that is used to enable a photographing function provided in the present invention and that is sent by the user, the processor of the mobile phone enables the photographing function in the mobile phone provided in the present invention, and sends an enabling command to a sensor of the mobile phone; and the sensor of the mobile phone performs real-time detection based on the enabling command | 101 |

↓

| A gravity sensor in the mobile phone sensor detects in real time an acceleration and a moving distance of the mobile phone in each direction; a capacitive touch sensor detects in real time a quantity of fingers and a fingerprint shape when the user holds the mobile phone; and each sensor transmits in real time a detection result to the processor of the mobile phone | 102 |

↓

| The processor of the mobile phone receives the detection result sent by each sensor; the processor of the mobile phone determines, based on the quantity of fingers and the fingerprint shape when the user holds the mobile phone in the detection result, that a manner in which the user holds the mobile phone is a vertical hold, and determines, based on the acceleration and the moving distance of the mobile phone in each direction in the detection result, that an angle at which the user views the display screen of the mobile terminal is a bottom view; and the processor of the mobile phone matches the posture feature of the vertical hold and the bottom view with a standard posture feature, and determines that the posture feature of the mobile phone matches the standard posture feature | 103 |

CONT.
FROM
FIG. 3a-1

| The display screen of the mobile phone detects that the user performs any one of the following touch operations on the display screen of the mobile phone: pressing the display screen of the mobile phone with a preset finger, tapping the display screen of the mobile phone for a first preset quantity of times, and sliding on the display screen of the mobile phone according to a preset track, and sends the detection result to the processor of the mobile phone; alternatively, a fingerprint sensor of the mobile phone detects a touch operation pressed by the user on the mobile phone for a second preset quantity of times, and sends the detection result to the processor of the mobile phone | 103a |

| The processor of the mobile phone receives the detection result sent by the display screen of the mobile phone or the fingerprint sensor of the mobile phone, and determines that the mobile phone receives the touch operation of the user | 103b |

| The processor of the mobile phone starts a front-facing camera to photograph | 104 |

FIG. 3a-2

AUTOMATIC PHOTOGRAPHING METHOD AND TERMINAL BASED ON USE POSTURE

CROSS-REFERENCE TO RELATED APPLICATIONS

This application is a national stage of International Application No. PCT/CN2016/099125, filed on Sep. 14, 2016, which is hereby in cooperated by reference in its entirety.

TECHNICAL FIELD

The present invention relates to photographing technologies of terminals, and in particular, to a photographing method and a terminal.

BACKGROUND

With continuous development of science and technology, functions of a mobile terminal such as a smartphone or a personal digital assistant (English: Personal Digital Assistant, PAD) are increasingly powerful, and a growing quantity of users like to photograph and image shooting by using the mobile terminal such as a smartphone.

To facilitate taking a selfie by a user, in the prior art, a master camera and a selfie camera are disposed in many smartphones. The selfie camera is mainly used for taking a selfie, and a default photographing camera of the smartphone is the master camera. If the user wants to take a selfie by using the selfie camera, the user needs to first trigger a virtual key on a display screen or a physical key of the smartphone to open a selfie interface, and then complete taking a selfie by using the selfie interface. A whole process requires a user to perform a plurality of operations, and consequently, operations are relatively complex.

SUMMARY

This application provides a photographing method and a terminal, so as to resolve an existing problem of complex operations when a user photographs.

To achieve the foregoing objective, the following technical solutions are used in this application:

According to a first aspect, a photographing method is provided, and the method may be applied to a mobile terminal equipped with at least one camera, the at least one camera includes a first camera, and the method may include: determining, by the mobile terminal, whether the mobile terminal meets a preset condition, where the preset condition may include matching of a posture feature of the mobile terminal with a standard posture feature that is used to represent a posture feature of the mobile terminal when a user uses the first camera to photograph; and if the mobile terminal determines that the mobile terminal meets the preset condition, starting the first camera to photograph.

The standard posture feature may be entered by a mobile phone manufacturer or a photographing application developer into a memory of the mobile terminal before delivery of the mobile terminal, stored in a photographing application, or entered by the user into the mobile terminal.

Optionally, starting the first camera to photograph may specifically include: starting the first camera; and when a photographing interface corresponding to the first camera automatically pops up on a display screen of the mobile terminal, after a picture on the photographing interface becomes stable, automatically photographing, or after an operation of clicking a photographing button on the photographing interface by the user is received, completing photographing.

In this way, when it is detected that the posture feature of the mobile terminal matches the standard posture feature, a camera in the mobile terminal is automatically started to photograph. Therefore, the camera is started, without manually touching a screen or pressing a key, to photograph. This simplifies a photographing operation process, and resolves a problem of complex operations, thereby improving convenience of photographing by using the mobile terminal.

In an implementation of the first aspect, with reference to the first aspect, to improve security of using a front-facing camera to take a selfie by the user, the foregoing preset condition may further include: receiving a touch operation of the user by the mobile terminal, that is, the mobile terminal detects that the posture feature of the mobile terminal matches the standard posture feature, and starts the first camera to photograph after receiving the touch operation of the user.

The touch operation may include but is not limited to any one of the following operations:
  pressing the display screen with a preset finger;
  tapping the display screen of the mobile terminal for a first preset quantity of times;
  pressing a fingerprint sensor of the mobile terminal for a second preset quantity of times; and
  sliding on the display screen of the mobile terminal according to a preset track.

In this way, in addition to the posture feature matching, the mobile terminal needs to receive the touch operation of the user before performing a photographing function of the first camera, so that double verification is performed before photographing, thereby ensuring security of photographing and avoiding a misoperation.

In another implementation of the first aspect, with reference to either the first aspect or the foregoing implementation of the first aspect, to improve accuracy of using the first camera to take a selfie, some matching conditions may be added, for example, the preset condition further includes: determining, by the mobile terminal, that a moving track of the mobile terminal is the same as a moving track of the mobile terminal when the user uses the first camera to photograph, that is, the mobile terminal detects that the posture feature of the mobile terminal matches the standard posture feature, and starts the first camera to photograph after detecting that the moving track of the mobile terminal matches the moving track that is of the mobile terminal when the user uses the first camera to photograph and that is stored in the mobile terminal.

In this way, in addition to the posture feature matching, to implement a photographing function, it is required to determine whether a series of actions when the user photographs meet a habitual action when the user photographs. This conforms to a photographing habit of an individual user, and improves accuracy of photographing.

In still another implementation of the first aspect, with reference to any one of the first aspect or the implementations of the first aspect, to meet the user's requirement for real-time photographing, for example, a requirement for photographing when a posture feature is not matched, the method may further include:
  if the mobile terminal does not detect that a posture feature of a mobile phone matches a standard posture feature in a mobile phone memory, that is, the standard posture feature is not detected, but a touch operation of the user is detected, starting a default camera in the mobile phone to photograph.

The touch operation may be the foregoing touch operation, and the default camera may be a rear-facing camera.

In this way, a camera may be started in real time based on a personal requirement of the user, so that user experience is improved.

In yet another implementation of the first aspect, with reference to any one of the first aspect or the implementations of the first aspect, to avoid a problem of a photographing error due to the fact that a unique posture feature when an individual user photographs and the standard posture feature when most users photograph do not match, before the posture feature matching is performed, it is further required to determine, when the mobile terminal detects, for the first time, that the user performs the standard posture feature, whether the standard posture feature is a personal unique posture feature when the user photographs, and specific implementations are as follows.

The mobile terminal detects, for the first time after power-on, that the posture feature of the mobile terminal matches the standard posture feature, and the mobile terminal sends, to the user, first prompt information that is used to query whether to start the first camera to photograph; and
- if the mobile terminal receives first confirmation information that is returned by the user and that is used to confirm starting of the first camera to photograph, the mobile terminal considers that the user uses the standard posture feature as the unique posture feature of the mobile terminal when the user uses the first camera to photograph, and starts the first camera to photograph when the standard posture feature is subsequently detected again; or
- if the mobile terminal does not receive first confirmation information that is returned by the user and that is used to confirm starting of the first camera to photograph, the mobile terminal considers that the user currently wants to start, by using the standard posture feature, the first camera to photograph; in this case, the mobile terminal may reduce sensitivity in identifying the standard posture feature; and sends prompt information that is used to query whether to start the first camera to photograph when detecting that the user uses the standard posture feature for N (N is an integer greater than or equal to 2) times subsequently, and starts, based on the confirmation information returned by the user, the first camera to photograph; or does not send, to the user, prompt information that is used to query whether to start the first camera to photograph when detecting that the user uses the standard posture feature.

In this way, when the mobile terminal detects the standard posture feature for the first time, verification may be performed to determine whether the posture feature is the expected unique posture feature when the user photographs. After confirmation of the user is received, the camera is started to complete photographing when the posture feature is subsequently detected again. Photographing is implemented as expected by the user, thereby avoiding a misoperation and improving user experience.

In still yet another implementation of the first aspect, with reference to any one of the first aspect or the implementations of the first aspect, to reduce production costs of a device before delivery, before the determining whether the mobile terminal meets a preset condition, the method may further include:
detecting that the user uses the first camera to photograph;
sending, to the user, prompt information used to prompt the user whether to store the posture feature of the mobile terminal when the user uses the first camera to photograph; and
if the second confirmation information that is used to instruct the mobile terminal to store the posture feature of the mobile terminal when the user uses the first camera to photograph and that is fed back by the user is received, storing the posture feature of the mobile terminal when the user uses the first camera to photograph in the mobile terminal as the standard posture feature.

In this way, there is no need to store the standard posture feature in the mobile terminal before delivery of the mobile terminal. Instead, after an action of photographing by the user is detected, the action is stored in the mobile terminal as the standard posture feature, so as to start the camera to take a selfie when the posture feature is detected, thereby reducing production costs of entering the standard posture feature before delivery of the mobile terminal.

According to a second aspect, a mobile terminal is provided, where the mobile terminal may include at least one camera and a processor, and the at least one camera includes a first camera.

The processor is configured to determine whether the mobile terminal meets a preset condition, where the preset condition includes matching of a posture feature of the mobile terminal with a standard posture feature; and
the processor is further configured to: if the processor determines that the mobile terminal meets the preset condition, send a photographing instruction to the first camera, where the photographing instruction is used to instruct the first camera to photograph.

The first camera is configured to photograph based on the photographing instruction.

The standard posture feature is used to represent a posture feature of the mobile terminal when a user uses the first camera to photograph.

According to a third aspect, a non-volatile computer readable storage medium storing one or more programs is provided, where the one or more programs include an instruction, and when the instruction is executed by the mobile terminal according to any one of the second aspect or the possible implementations of the second aspect or according to any one of the third aspect or the possible implementations of the third aspect, the mobile terminal performs the following event:
determining whether the mobile terminal meets a preset condition, where the preset condition includes matching of a posture feature of the mobile terminal with a standard posture feature that is used to represent a posture feature of the mobile terminal when a user uses a first camera to photograph; and if the mobile terminal determines that the mobile terminal meets the preset condition, starting the first camera to photograph.

For specific implementations of the second aspect and the third aspect, reference may be made to behaviors and functions of the mobile terminal in the photographing method according to any one of the first aspect or the possible implementations of the first aspect, and details are not described herein again. In addition, the mobile terminal provided in the second aspect and the third aspect can achieve a same beneficial effect as that in the first aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 3 is a flowchart of a photographing method according to an embodiment of the present invention;

FIG. 3a-1 and FIG. 3a-2 are a flowchart of another photographing method according to an embodiment of the present invention;

DESCRIPTION OF EMBODIMENTS

A principle of the present invention is to collect statistics about a common posture (for example, a holding manner or a holding posture of a user) when most users use a camera of a mobile terminal to photograph, and to store the common posture in the mobile terminal. When it is detected that the mobile terminal is in the posture, the camera in the mobile terminal is automatically started to photograph. A photographing method is optimized, and the camera is started, without manually touching a screen or pressing a key, to photograph, thereby improving convenience of photographing by using the mobile terminal.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Before the solutions are described in detail, to facilitate understanding of the technical solutions in the present invention, some important nouns in the present invention are explained in detail. It should be understood that the following nouns are named by persons skilled in the present invention only for convenience of description, do not represent or imply that an indicated system or element needs to have the name, and therefore should not be construed as a limitation on the present invention.

A posture feature may be a manner in which a user holds a mobile terminal, a visual angle at which a user views a display screen of a mobile terminal, or a manner in which a user holds a mobile terminal and a visual angle at which the user views a display screen of the mobile terminal.

Figure 1A:
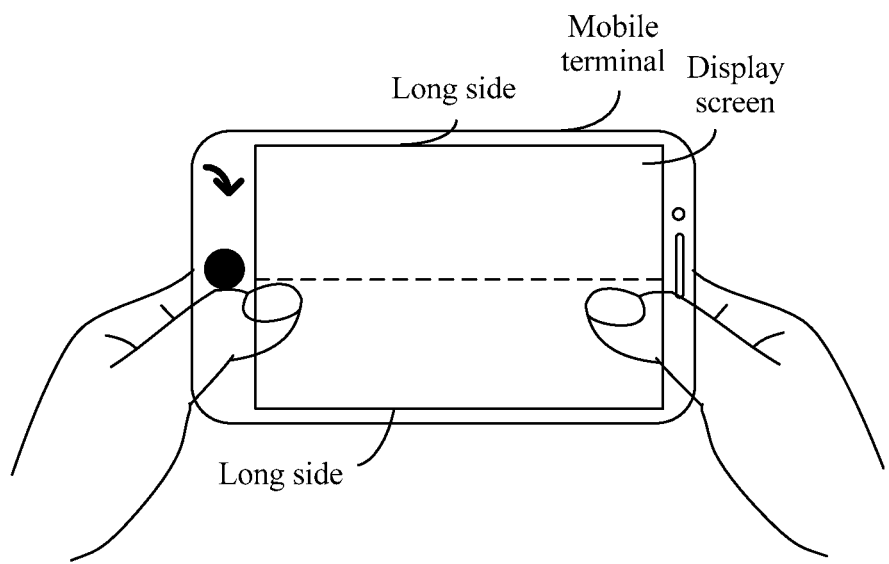
FIG. 1a is a schematic diagram of a manner in which a user holds a mobile terminal.
Figure 1B:
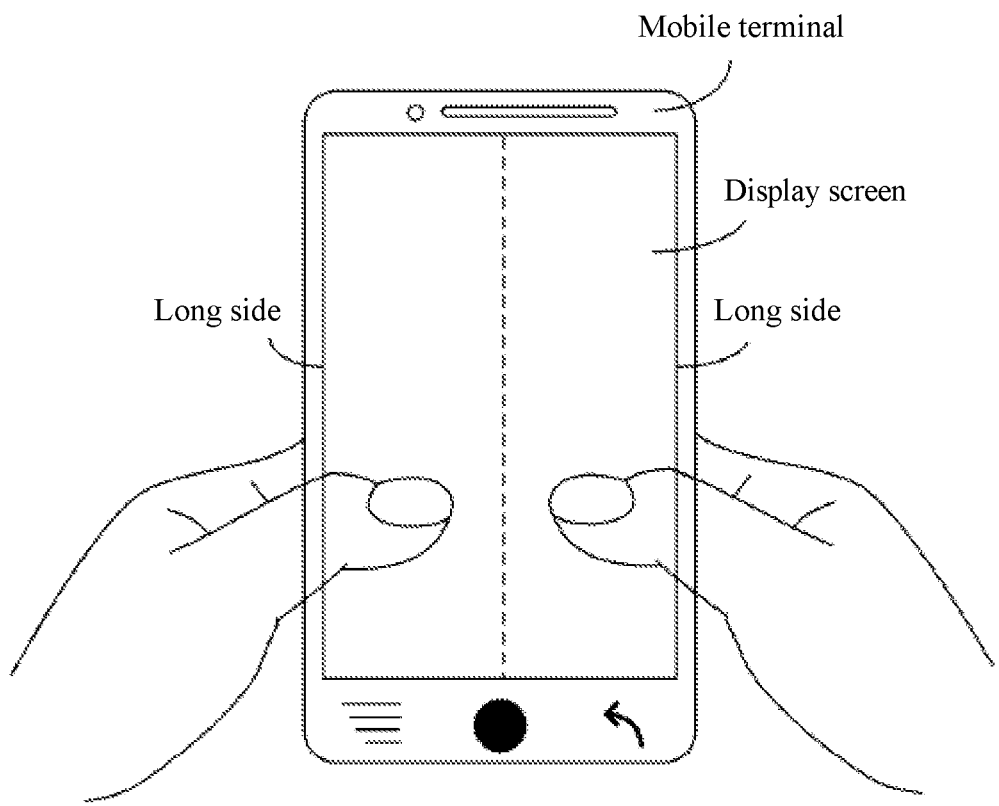
FIG. 1b is a schematic diagram of a manner in which a user holds a mobile terminal.
Figure 1C:
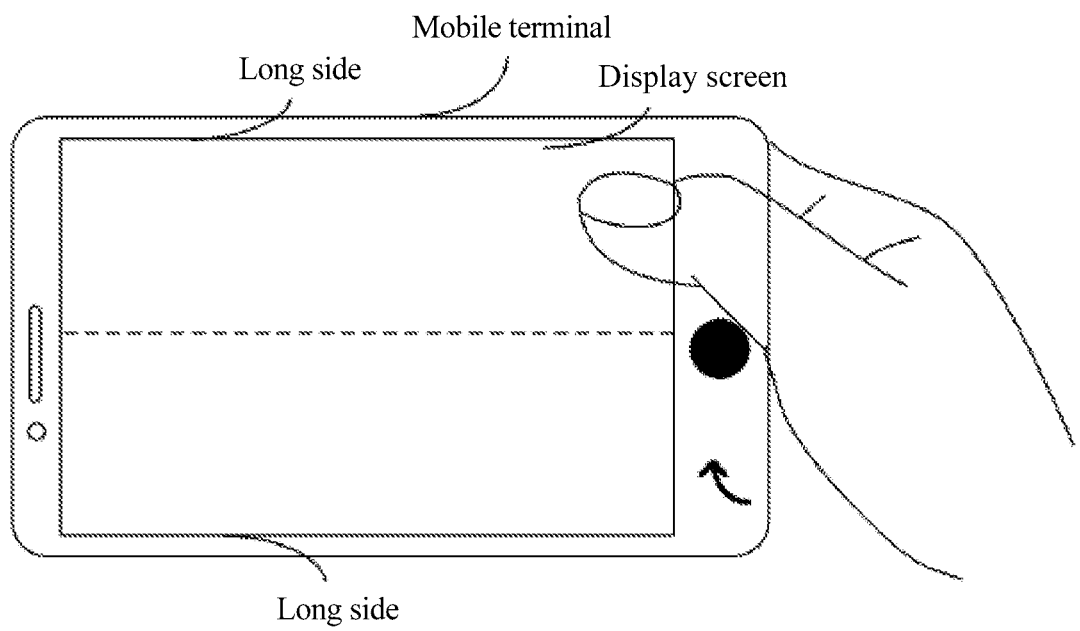
FIG. 1c is a schematic diagram of a manner in which a user holds a mobile terminal.

Manners of holding a mobile terminal by a user may include but are not limited to a horizontal hold, a vertical hold, a one-hand hold, or a two-hand hold. The horizontal hold means that the user holds the mobile terminal by using one hand or two hands when a long side of a display screen of the mobile terminal is in parallel with a ground (as shown in FIG. 1a). The vertical hold means that the user holds the mobile terminal by using one hand or two hands when a long side of a display screen of the mobile terminal is perpendicular to a ground (as shown in FIG. 1b). The one-hand hold means that the user holds the mobile terminal by using only the left hand or the right hand (as shown in FIG. 1c). The two-hand hold means that the user holds the mobile terminal by using both the left hand and the right hand (as shown in FIG. 1a or FIG. 1b). Optionally, a quantity of fingers and a fingerprint shape when the user holds the mobile terminal may be detected by using a capacitive touch sensor disposed in the mobile terminal, and a manner of holding a mobile phone by the user is determined based on the detected quantity of fingers and fingerprint shape. In the mobile terminal, the capacitive touch sensor may be disposed at a location (for example, a location such as one of four borders or a rear side) that is easy for the user to hold. For how the capacitive touch sensor detects the quantity of fingers and the fingerprint shape when the user holds the mobile terminal, and how a manner of holding the mobile phone by the user is determined based on the detected quantity of fingers and fingerprint shape, refer to the prior art, and details are not described herein.

Figure 1D:
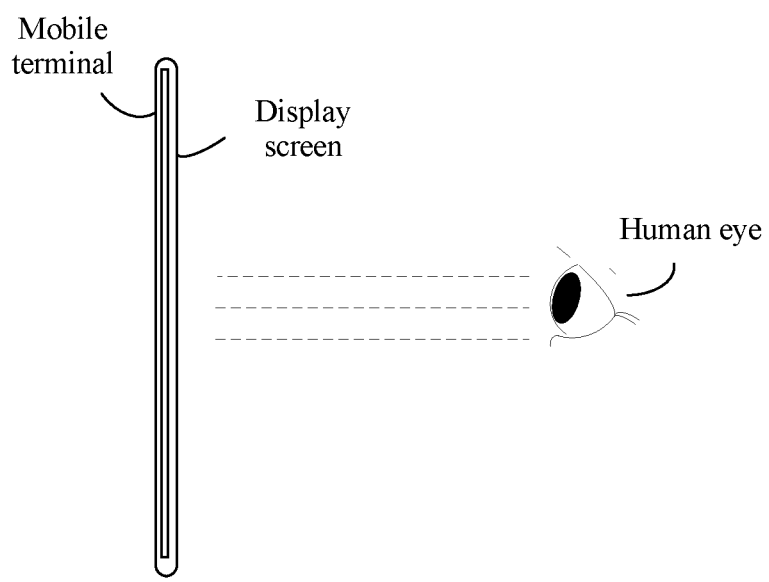
FIG. 1d is a schematic diagram of a visual angle at which a user views a display screen of a mobile terminal.
Figure 1E:
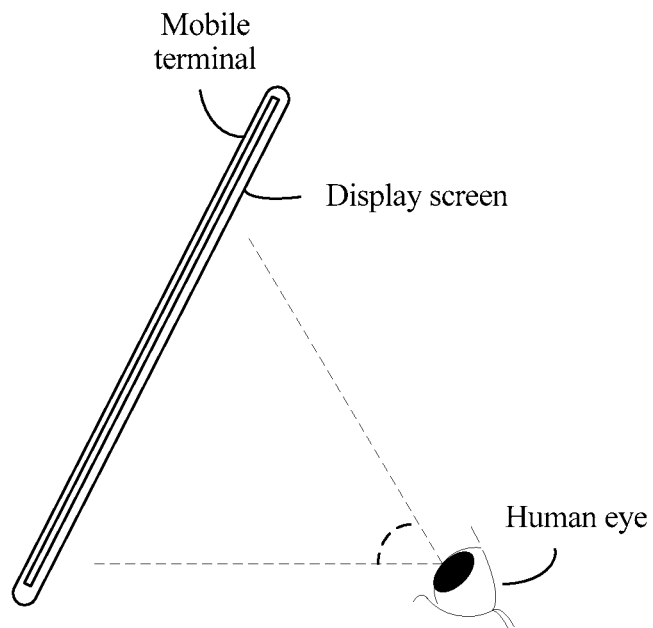
FIG. 1e is a schematic diagram of a visual angle at which a user views a display screen of a mobile terminal.
Figure 1F:
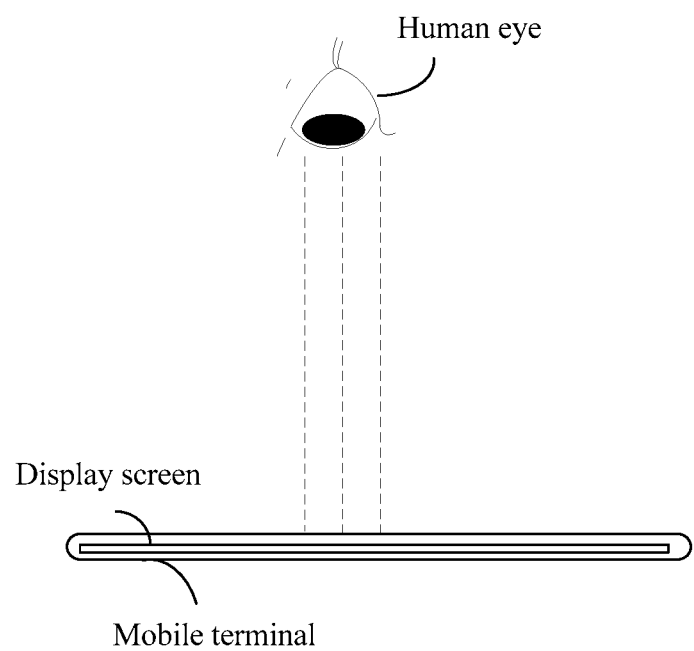
FIG. 1f is a schematic diagram of a visual angle at which a user views a display screen of a mobile terminal.

The visual angles at which the user views the display screen of the mobile terminal may include but are not limited to a head-up view, a bottom view, and a top view. Generally, a line-of-sight direction of the user is roughly perpendicular to a screen in which the display screen of the mobile terminal is located. For ease of measurement, an included angle (that is, a tilt angle of the mobile terminal) between the long side of the display screen of the mobile terminal and a horizontal ground may be used to determine a visual angle at which the user views the display screen of the mobile terminal. The long side of the display screen of the mobile terminal is a side with a longest length in four sides of the display screen of the mobile terminal. Generally, when the long side of the display screen of the mobile terminal is perpendicular (90 degrees) to the horizontal ground, the user views the mobile terminal horizontally, and a visual angle at which the user views the display screen of the mobile terminal is the head-up view (as shown in FIG. 1d); when an included angle between the long side of the display screen of the mobile terminal and the horizontal ground is any angle between 90 degrees and 45 degrees, the user looks up at the mobile terminal, and a visual angle at which the user views the display screen of the mobile terminal is the bottom view (as shown in FIG. 1e); or when an included angle between the long side of the display screen of the mobile terminal and the horizontal ground is 0 degree, the user looks down on the mobile terminal, and a visual angle at which the user views the display screen of the mobile terminal is the top view (as shown in FIG. 1f). Optionally, after the mobile terminal is picked up by the user, a moving distance and an acceleration in a vertical direction may be detected by a gravity sensor disposed inside the mobile terminal. An included angle between the long side of the display screen of the mobile terminal and the horizontal ground is calculated based on the moving distance and the acceleration. For a detection process of the gravity sensor and a process of calculating the included angle, refer to the prior art, and details are not described herein.

Standard posture feature: If a mobile terminal maintains a same posture feature in a whole process in which most users pick up the mobile terminal, start a camera of the mobile terminal, start photographing, and complete photographing, the posture feature is considered as the standard posture feature of the camera during photographing. For example, according to a result of a user behavior survey, 90% of users get used to holding a mobile phone vertically and looking up at a photographing interface (that is, a tilt angle of the mobile phone is any angle between 90 degrees and 45 degrees) when using a front-facing camera of the mobile phone to take a selfie. In this case, a posture feature of the vertical hold and the bottom view may be used as a standard posture feature of the front-facing camera during photographing.

Unique posture feature: For an individual user, if a mobile terminal maintains a same posture feature when the user picks up the mobile terminal for a plurality of times and uses a camera of the mobile terminal to photograph, the posture feature may be used as the unique posture feature when the user uses the camera to photograph; alternatively, based on a photographing habit of a user, a moving track of a mobile terminal in a whole process in which the user picks up the mobile terminal and completes photographing is recorded, and both the posture feature of the mobile terminal during photographing and the moving track of the mobile terminal during photographing are used as the unique posture feature when the user uses the camera to photograph.

Front-facing camera: A camera located on a display screen of a mobile terminal is referred to as the front-facing camera.

Rear-facing camera: A camera located on a rear housing of a mobile terminal is referred to as the rear-facing camera.

Multi-lens camera: A camera that includes a plurality of lenses is referred to as the multi-lens camera. For example, a dual-lens camera may include two lenses: one is configured to take a B/W image, and the other is configured to take a color image.

The photographing method provided in the embodiments of the present invention is applied to a mobile terminal with one or more cameras. The mobile terminal may be a terminal device such as a mobile phone, a tablet computer, a notebook computer, a UMPC (English: Ultra-mobile Personal Computer, ultra-mobile personal computer), a netbook, or a PDA. The mobile terminal may include but is not limited to one or more of the front-facing camera, the rear-facing camera, and the multi-lens camera. Specifically, in the embodiments of the present invention, an example in which the mobile terminal is the mobile phone is used to describe the photographing method provided in the present invention.

Components of a mobile phone 10 are described below in detail with reference to FIG. 2.

As shown in FIG. 1, the mobile phone 10 may include components such as a display screen 101, a processor 102, a memory 103, a sensor 104, and at least one camera 105. These components may be connected by using a bus, or may be directly connected. Persons skilled in the art may understand that a structure of the mobile phone shown in FIG. 1 constitutes no limitation on the mobile phone, and the mobile phone may include components more than those shown in FIG. 1, or have some components combined, or have a different component arrangement.

The display screen 101 may be referred to as a touch display panel, and is configured to: implement input and output functions of the mobile phone 10, collect a touch operation performed on the display screen 101 or near the display screen 101 by a user (for example, an operation performed on the display screen 101 or near the display screen 101 by using any suitable object or accessory such as a finger or a stylus by the user), drive a corresponding connected apparatus based on a preset program, and display information input by the user, information provided to the user (for example, an image collected by using a camera) and various menus of the mobile phone. Optionally, the display screen 101 may include two parts: a touch detection apparatus and a touch controller. The touch detection apparatus detects a touch direction of the user, detects a signal brought by the touch operation, and sends the signal to the touch controller. The touch controller receives touch information from the touch detection apparatus, converts the touch information to a contact coordinate, sends the contact coordinate to the processor 102, receives and executes a command sent by the processor 102, and transmits, after the display screen 101 detects the touch operation on the display screen 101 or near display screen 101, the touch operation to the processor 102 to determine a type of a touch event.

As a control center of the mobile phone 10, the processor 102 uses various interfaces and lines to connect parts of the entire mobile phone, and performs various functions (for example, control a camera of the mobile phone 10 to photograph) of the mobile phone 10 and data processing by running or executing a software program and/or module stored in the memory 103 and invoking data stored in the memory 103, so as to perform overall monitoring on the mobile phone. Specifically, the processor 102 may receive data transmitted by the sensor 104, determine a current posture feature of the mobile phone 10 based on the data, and automatically start a first camera to complete photographing after determining that the posture feature of the mobile phone 10 and a standard posture feature are matched. The standard feature posture is a standard feature posture of the first camera during photographing. The first camera may be a front-facing camera, a rear-facing camera, or any other camera. This is not limited in this embodiment of the present invention.

The memory 103 may be configured to store data, a software program, and a module, and may be a volatile memory (English: volatile memory), such as a random-access memory (English: random-access memory, RAM); or a non-volatile memory (English: non-volatile memory), such as a read-only memory (English: read-only memory, ROM), a flash memory (English: flash memory), a hard disk drive (English: hard disk drive, HDD), a solid-state drive (English: solid-state drive, SSD), or a combination of the foregoing types of memories. Specifically, the processor 102 may store program code, and the program code is used to enable the processor 102 to perform the photographing method provided in this embodiment of the present invention by executing the program code.

The sensor 104 includes but is not limited to a gravity sensor and a capacitive touch sensor. The gravity sensor (gravity sensor) may detect an acceleration and a moving distance of the mobile phone 10 in each direction (generally, three axes), and transmit a result such as the detected acceleration and moving distance to the processor 102, so that the processor 102 determines an angle at which the user views the display screen of the mobile terminal. The capacitive touch sensor may be configured to: detect a quantity of fingers and a fingerprint shape when the user holds the mobile phone 10, and transmit the detected result to the processor 102, so that the processor 102 determines a manner in which the user holds the mobile phone 10. In addition, another sensor may be disposed in the mobile phone 10, for example, a gyroscope, a barometer, a hygrometer, a thermometer, or an infrared sensor. Details are not described herein.

The camera 105 is a component that has a basic function such as video shooting/transmission and static image capture, and is mainly configured to collect an image, and transmit the collected image to the processor 102. The collected image is stored in the memory 103 after being processed by the processor 102.

Although not shown in the figure, the mobile phone 10 may further include a Wireless Fidelity (English: wireless fidelity, WiFi) module, a Bluetooth module, a fingerprint sensor, a power supply (for example, a battery) supplying power to components, and the like. Details are not described herein.

Figure 2:
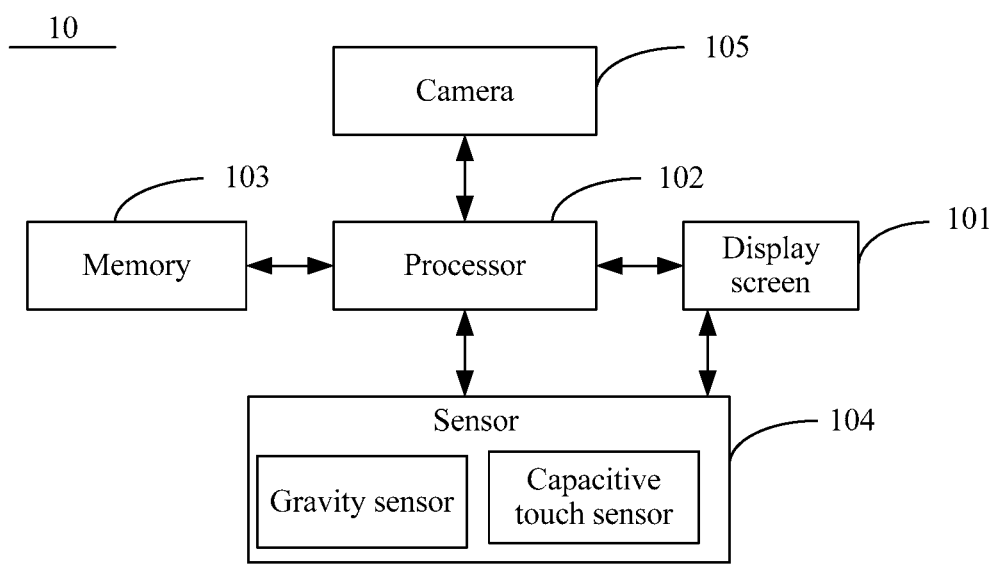
FIG. 2 is a schematic structural diagram of a mobile phone 10.

To make the objective, technical solutions, and advantages of the present invention clearer, the following describes in detail a photographing method provided in this embodiment of the present invention with reference to a specific component of the mobile phone 10 shown in FIG. 2 and an example in which a first camera is a front-facing camera in the mobile phone 10 and a posture feature includes a manner in which a user holds the mobile phone and a visual angle at which the user views a display screen of a mobile terminal (as shown in FIG. 3). For a photographing process of another camera, reference may also be made to this embodiment, and details are not described herein.

A mobile phone manufacturer or a photographing application developer may conduct a survey of behaviors (a manner in which a user holds a mobile phone and an angle at which the user views a display screen of the mobile phone) when a large quantity of users use the front-facing camera to take a selfie. If it is found that most people usually take a selfie in a manner of vertically holding and looking up at the mobile phone when using the front-facing camera, it is determined that a posture feature of the vertical hold and the bottom view is a standard posture feature when the front-facing camera is used to take a selfie, and the standard posture feature is entered into a memory of a mobile phone before delivery of the mobile phone, or the standard posture feature is stored in a photographing application. In another implementation, the user may enter the standard posture feature into the mobile terminal, for example, when a standard posture feature needs to be entered into the mobile phone, a processor of the mobile phone may display, on the display screen of the mobile phone, a user interface related to storage of the standard posture feature; the user enters the posture feature of vertically holding and looking up at the mobile phone into an input box of the user interface, and clicks a storage button on the user interface; and the processor of the mobile phone stores the posture feature entered by the user into the mobile phone after receiving an operation of clicking the storage button by the user by using the display screen.

Step 101: After the processor of the mobile phone detects that the mobile phone is powered on, the processor of the mobile phone automatically enables a photographing function in the mobile phone provided in the present invention, and sends an enabling command to a sensor of the mobile phone, and the sensor of the mobile phone performs real-time detection based on the enabling command; alternatively, after receiving an operation that is used to enable a photographing function provided in the present invention and that is sent by the user, the processor of the mobile phone enables the photographing function in the mobile phone provided in the present invention, and sends an enabling command to a sensor of the mobile phone, and the sensor of the mobile phone performs real-time detection based on the enabling command.

Step 102: A gravity sensor in the mobile phone sensor detects in real time an acceleration and a moving distance of the mobile phone in each direction; a capacitive touch sensor detects in real time a quantity of fingers and a fingerprint shape when the user holds the mobile phone; and each sensor transmits in real time a detection result to the processor of the mobile phone.

Step 103: The processor of the mobile phone receives the detection result sent by each sensor; the processor of the mobile phone determines, based on the quantity of fingers and the fingerprint shape when the user holds the mobile phone in the detection result, that a manner in which the user holds the mobile phone is the vertical hold, and determines, based on the acceleration and the moving distance of the mobile phone in each direction in the detection result, that an angle at which the user views the display screen of the mobile terminal is a bottom view; and the processor of the mobile phone matches the posture feature of the vertical hold and the bottom view with the standard posture feature, and determines that the posture feature of the mobile phone matches the standard posture feature.

For example, that the posture feature of the mobile phone matches the standard posture feature may specifically include the following:

A manner of holding a mobile phone by a user is the same as a holding manner included in a standard posture feature, and an angle at which the user views a display screen of a mobile terminal is the same as an angle that is used by the user to view a display screen of a mobile terminal and that is included in the standard posture feature.

Step 104: The processor of the mobile phone starts the front-facing camera to photograph.

For example, that the processor of the mobile phone starts the front-facing camera to photograph may specifically include the following:

The processor of the mobile phone displays some selfie user interfaces on the display screen of the mobile phone, and sends an instruction for enabling a photographing function to the front-facing camera; the front-facing camera starts to collect an image based on the instruction; and after the processor of the mobile phone detects, according to the detection result sent by the sensor of the mobile phone, that a body of the mobile phone is stable, that is, an image presented on the user interface no longer shakes, the processor of the mobile phone sends a photographing instruction to the front-facing camera, and the front-facing camera completes taking a selfie based on the photographing instruction; or the processor of the mobile phone sends an instruction for enabling a photographing function to the front-facing camera, and the front-facing camera starts to collect an image based on the instruction; in addition, the processor of the mobile phone displays some selfie user interfaces on the display screen of the mobile phone; and after the processor of the mobile phone determines that the display screen of the mobile phone receives an operation of clicking a photographing button on the user interface by the user, the processor of the mobile phone sends a photographing instruction to the front-facing camera, and the front-facing camera completes taking a selfie based on the photographing instruction.

It should be noted that, in the foregoing solution, once the processor of the mobile phone determines that the posture feature of the mobile phone matches the standard posture feature, the front-facing camera is started to photograph, and there is no need to consider a current interface or status of the mobile phone, for example, use of another camera (a rear-facing camera) for photographing, or a standby state. For example, if the user needs to take a selfie in a process of using the rear-facing camera, the user vertically holds and looks up at the mobile phone. In this case, the processor of the mobile phone may automatically start the front-facing camera of the mobile phone, and switch from the rear-facing camera to the front-facing camera to take a selfie.

To improve security of using the front-facing camera to take a selfie by the user, in an implementation of this solution, in addition to feature matching, the mobile phone needs to receive some touch operations of the user before performing the photographing function. As shown in FIG. 3a-1 and FIG. 3a-2, after the foregoing step 103 and before step 104, the method may further include the following process.

Step 103a: The display screen of the mobile phone detects that the user performs any one of the following touch operations on the display screen of the mobile phone: pressing the display screen of the mobile phone with a preset finger, tapping the display screen of the mobile phone for a first preset quantity of times, and sliding on the display screen of the mobile phone according to a preset track, and sends the detection result to the processor of the mobile phone; or a fingerprint sensor of the mobile phone detects a touch operation pressed by the user on the mobile phone for a second preset quantity of times, and sends the detection result to the processor of the mobile phone.

The preset finger may be any finger of the user, and generally, may be a thumb. The first preset quantity of times and the second preset quantity of times are preset fixed values. This is not limited in this embodiment of the present invention. Generally, the first preset quantity of times and the second preset quantity of times may be set to 2 or 3.

The preset track may be a preset sliding track, may be a curve (for example, an "S" shape) track, or may be a straight-line track. This is not limited in this embodiment of the present invention.

Step 103b: The processor of the mobile phone receives the detection result sent by the display screen of the mobile phone or the fingerprint sensor of the mobile phone, and determines that the mobile phone receives the touch operation of the user.

The touch operation of the user includes any one of the following operations:

pressing the display screen with a preset finger;
    tapping the display screen of the mobile terminal for a first preset quantity of times;
    pressing a fingerprint sensor of the mobile terminal for a second preset quantity of times; and
    sliding on the display screen of the mobile terminal according to a preset track.

Pressing the display screen of the mobile phone with a preset finger by the user may also be referred to as fingerprint unlocking. Screen fingerprint unlocking recognition may mean that the user uses the preset finger to press the display screen of the mobile phone, so as to print a fingerprint of the finger on the display screen of the mobile phone as much as possible, so that the display screen of the mobile phone can collect the finger fingerprint and send the collected mobile phone fingerprint to the processor of the mobile phone, and then the processor of the mobile phone matches the collected finger fingerprint with a finger fingerprint that is used for unlocking and that is stored in the mobile phone, and performs unlocking based on a matching result.

Further, to improve accuracy of using the front-facing camera to take a selfie, in another implementation of this solution, in addition to the posture feature matching, accuracy of taking a selfie may be improved by determining whether a series of actions (that is, a moving track of the mobile phone) when the user takes a selfie meet a habitual action when the user takes a selfie. Specifically, an implementation of the function is as follows:

The sensor of the mobile phone detects an acceleration and a distance of the mobile phone in each direction in a process in which the user picks up the mobile phone and uses the front-facing camera to photograph, and sends the detection result to the processor of the mobile phone;

the processor of the mobile phone determines, based on the detection result, a moving track of the mobile phone when the user takes a selfie, and stores the moving track in a memory of the mobile phone; and
    if the processor of the mobile phone determines that the posture feature of the mobile phone matches the standard posture feature, and determines, based on the detection result sent by the sensor of the mobile phone, that the moving track of the mobile phone matches a moving track of the mobile phone stored in the mobile phone, the front-facing camera is started to photograph.

For example, the posture feature when the user takes a selfie is vertically holding and looking up at the mobile phone, and the user needs to make a pause after lifting the mobile phone from a low position to a position that is about 20 cm above a horizontal line of a head, and then takes a selfie. In this case, the moving track of the mobile phone from the low position to the position that is about 20 cm above the horizontal line of the head of the user may be stored in the mobile phone. After the processor of the mobile phone determines that the posture feature matches the standard posture feature, and the moving track of the mobile phone matches the stored moving track, the front-facing camera is started to take a selfie.

In addition, in actual application, if the user does not vertically hold or look up at the mobile phone, that is, does not perform the standard posture feature, and wants to photograph, the user may photograph by performing a touch operation to start a default camera in the mobile phone, so as to improve convenience of photographing by using the mobile phone. Specifically, an implementation of the function is as follows:

If the processor of the mobile phone determines, based on the detection result sent by the sensor of the mobile phone, that the posture feature of the mobile phone and the standard posture feature in the mobile phone memory do not match, that is, the standard posture feature is not detected, but the processor of the mobile phone determines, based on the detection result sent by the display screen of the mobile phone or the fingerprint sensor of the mobile phone, that the mobile phone receives the touch operation of the user, the default camera in the mobile phone is started for photographing.

The default camera may be the rear-facing camera.

In still another feasible solution of the present invention, to reduce production costs of a device before delivery, the standard posture feature may not be entered into a memory of a mobile phone before delivery of the mobile phone. Instead, after it is detected that the user performs an action of taking a selfie, the action is stored in the memory as the standard posture feature. After the posture feature is subsequently detected, the front-facing camera is automatically started to take a selfie. Specifically, an implementation of the function is as follows:

The mobile phone manufacturer or the photographing application developer does not enter the standard posture feature in the mobile phone.

Steps 201 to 202 are performed. Step 201 is the same as step 101, and step 202 is the same as step 102. Details are not described herein again.

Step 203: The processor of the mobile phone determines, based on the detection result sent by the sensor of the mobile phone, that the user vertically holds and looks up at the mobile phone, and sends first prompt information to the user by using the display screen of the mobile phone.

The first prompt information is used to prompt the user whether to store the posture feature of vertically holding and looking up at the mobile phone when the user uses the front-facing camera to photograph.

Figure 4:
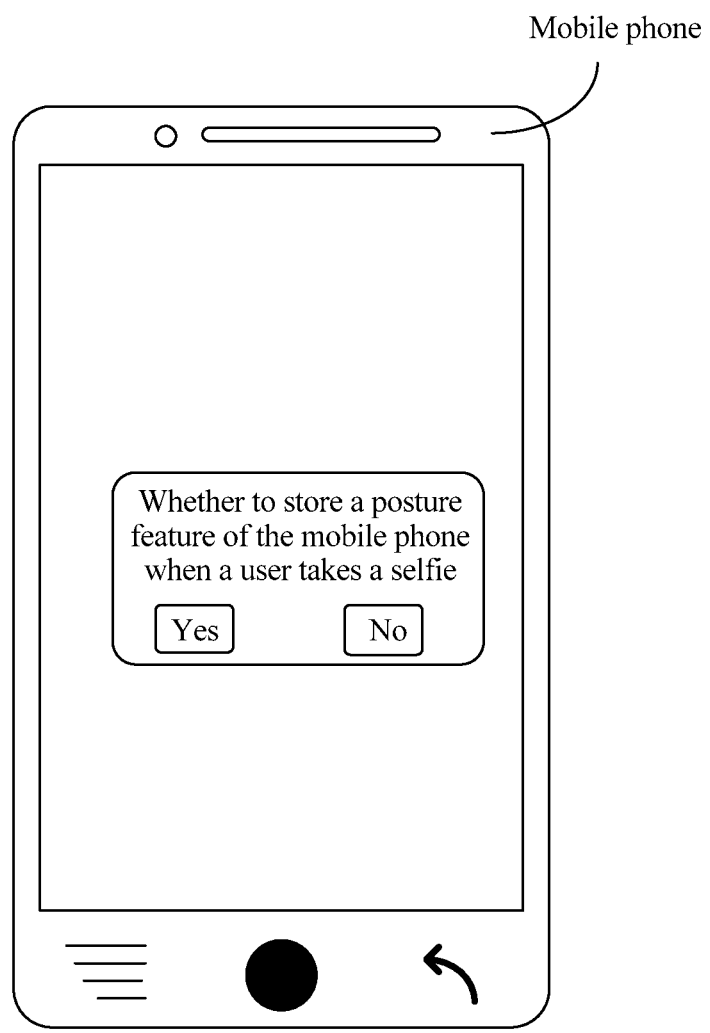
FIG. 4 is a schematic diagram of a prompt interface according to an embodiment of the present invention.

Optionally, the first prompt information may be displayed in any one of the following manners: an image, a text, a symbol, and a voice, but the display manner of the first prompt information is not limited thereto, and may be another display manner. This is not limited in this embodiment of the present invention. For example, as shown in FIG. 4, the processor of the mobile phone may display, on the display screen, a prompt box shown in FIG. 4. The prompt box includes a text: "Whether to store a posture feature of a mobile phone when a user takes a selfie" and a reply button. The text in the prompt box is the first prompt information.

Step 204: The processor of the mobile phone receives, by using the display screen of the mobile phone, first confirmation information returned by the user, and stores the posture feature of vertically holding and looking up at the mobile phone in the mobile phone as the standard posture feature.

So far, the standard posture feature is stored in the mobile phone.

The first confirmation information is used to instruct the mobile phone to store the posture feature of vertically holding and looking up at the mobile phone when the user uses the front-facing camera to photograph.

Optionally, the first confirmation information may be replied in any one of the following manners: The user clicks a confirmation button on the display screen; the user enters confirmation information on the display screen by using an input device; and the user replies a confirmation voice by using an audio device. However, the reply manner of the first confirmation information is not limited thereto, and may be another reply manner. This is not limited in this embodiment of the present invention. FIG. 4 is still used as an example. After seeing the prompt information in the prompt box, the user may click a "Yes" confirmation button in the prompt box. After confirming that the operation of clicking the confirmation button by the user is received, the processor of the mobile phone determines that the first confirmation information returned by the user is received.

Next, step 205 to step 207 are performed to implement selfie-taking by using the mobile phone. Step 205 is the same as step 102, step 206 is the same as step 103, and step 207 is the same as step 104. Details are not described herein again.

In yet another feasible solution of the present invention, to avoid a problem of a selfie error due to the fact that a unique posture feature when an individual user takes a selfie and the standard posture feature entered into the mobile phone when most users take a selfie do not match, before the posture feature matching is performed, it is further required to determine, when the processor detects, for the first time, that the user performs the standard posture feature, whether the standard posture feature is a personal unique posture feature when the user takes a selfie. The following describes the feasible solution in detail still with reference to specific components in the mobile phone 10 shown in FIG. 2 and an example in which a first camera is a front-facing camera in the mobile phone 10 and a posture feature includes a manner in which a user holds the mobile phone and a visual angle at which the user views a display screen of a mobile terminal.

Figure 5:
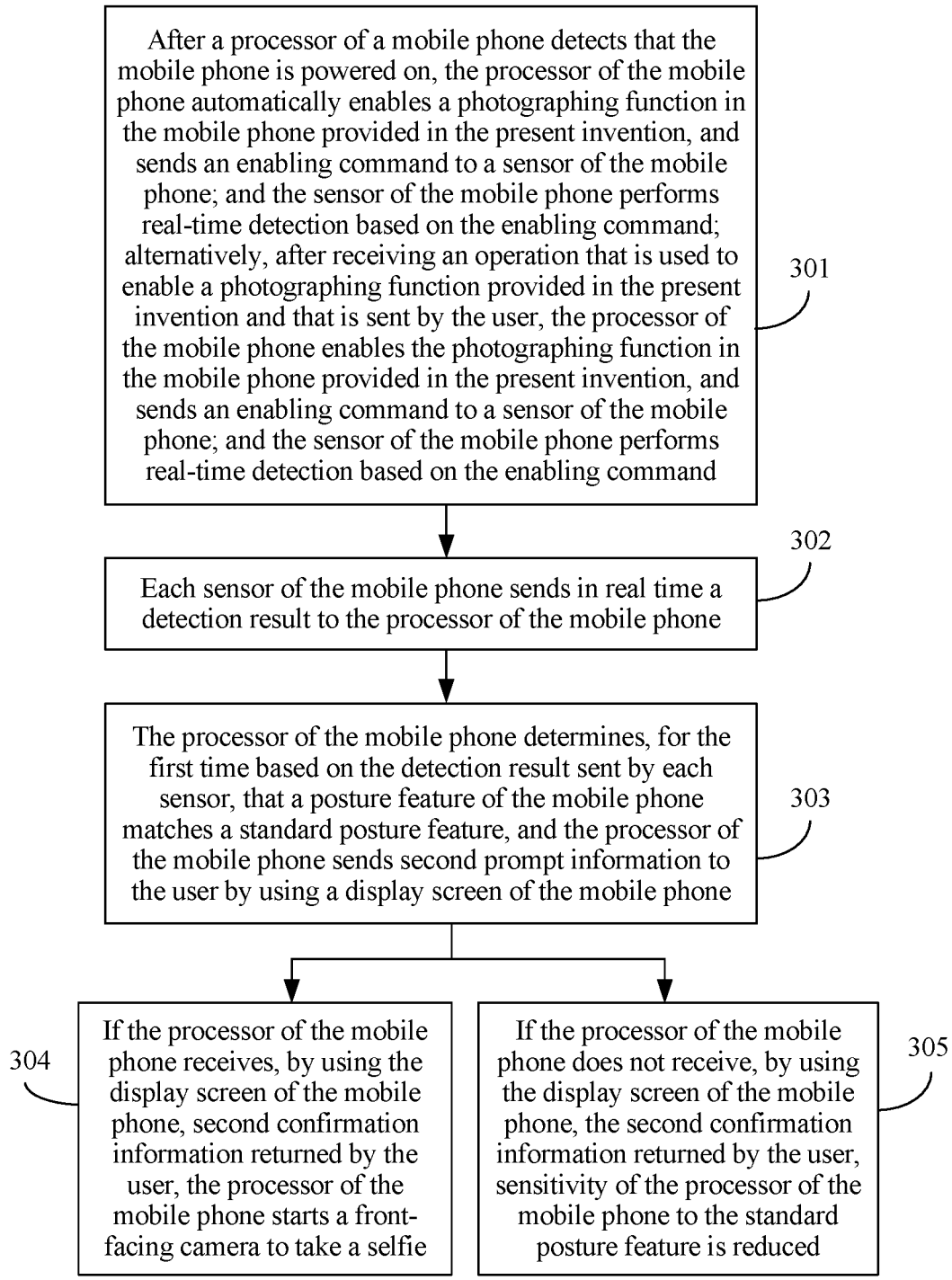
FIG. 5 is a flowchart of still another photographing method according to an embodiment of the present invention.

FIG. 5 is a flowchart of a photographing method according to an embodiment of the present invention. As shown in FIG. 5, the method includes the following steps.

A mobile phone manufacturer or a photographing application developer enters a standard posture feature when a mobile phone is used to take a selfie into a memory of the mobile phone before delivery of the mobile phone, or stores the standard posture feature in a photographing application. In another implementation, a user may enter the standard posture feature in a mobile terminal.

Step 301 is performed. Step 301 is the same as step 101, and details are not described herein again.

Step 302: Each sensor of the mobile phone sends in real time a detection result to a processor of the mobile phone.

Step 303: The processor of the mobile phone determines, for the first time based on the detection result sent by each sensor, that a posture feature of the mobile phone matches the standard posture feature, and the processor of the mobile phone sends second prompt information to the user by using a display screen of the mobile phone.

The second prompt information is used to query whether to start a front-facing camera to take a selfie.

Step 304: If the processor of the mobile phone receives, by using the display screen of the mobile phone, second confirmation information returned by the user, the processor of the mobile phone starts the front-facing camera to take a selfie.

The second confirmation message is used to instruct the mobile phone to start the front-facing camera to take a selfie. If the processor receives the confirmation message returned by the user, it indicates that the user wants to use a pose feature of vertically holding and looking up at the mobile phone as a unique posture feature when the user takes a selfie and to use a posture feature of a vertical hold and a bottom view as a unique posture feature when the user takes a selfie. When the user performs the action of vertically holding and looking up at the mobile phone subsequently again, the processor directly starts the front-facing camera to take a selfie.

It should be noted that a display manner of the second prompt information in the solution shown in FIG. 5 may be the same as the display manner of the foregoing first prompt information, and a reply manner of the second confirmation information may be the same as the reply manner of the foregoing first confirmation information. Details are not described herein again.

Step 305: If the processor of the mobile phone does not receive, by using the display screen of the mobile phone, the second confirmation information returned by the user, it indicates that the user may not want to start the front-facing camera when using this standard posture feature currently; in this case, sensitivity of the processor of the mobile phone to the standard posture feature is reduced, for example, when the processor of the mobile phone detects that the user uses the standard posture feature for N times, the processor of the mobile phone queries, by using the display screen, the user whether to start the front-facing camera to take a selfie, and takes a selfie based on confirmation information fed back by the user, where N is an integer greater than or equal to 2.

Alternatively, during this startup, even if the processor of the mobile phone detects the standard posture feature for a plurality of times subsequently by using the sensor of the mobile phone, the processor of the mobile phone no longer queries the user whether to start the front-facing camera to take a selfie.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein. In addition, in the foregoing embodiments, the mobile phone is only used as an example to describe the photographing method and the terminal provided in the present invention, and it may be understood that a photographing process of another mobile terminal and an internal structure of the terminal are the same as those of the mobile phone. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected according to actual needs to achieve the objective of the solutions of the embodiments.

In addition, functional units in the embodiments of the present invention may be integrated into one processing unit, or each of the functional units may exist alone, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a Universal Serial Bus (English: Universal Serial Bus, USB) flash drive (English: USB flash drive), a removable hard disk, a read-only memory (English: read-only memory, ROM), a random access memory (random access memory, RAM), a magnetic disk, or an optical disc.

Finally, it should be noted that, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A photographing method, implemented by a mobile phone, wherein the mobile phone comprises a front-facing camera, at least one sensor and a display screen, the method comprises:
    displaying a standby user interface;
    determining a posture of the mobile phone according to information obtained by the at least one sensor;
    automatically starting the front-facing camera to collect an image and displaying a photographing user interface corresponding to the front-facing camera, when it is determined that the mobile phone changes from a first posture to a second posture, the second posture being a manner in which a long side of the display screen of the mobile phone is perpendicular to a ground, and the photographing user interface corresponding to the front-facing camera comprising a photographing button;
    receiving a click on the photographing button; and
    in response to the click having been received, taking a photograph;
    displaying a prompt to query a user whether to start the front-facing camera when it is determined that the mobile phone changes from a first posture to a second posture for a first time;
    wherein automatically starting the front-facing camera to collect the image and displaying the photographing user interface corresponding to the front-facing camera comprises:
    automatically starting the front-facing camera to collect an image and displaying a photographing user interface corresponding to the front-facing camera after receiving a confirmation message from the user in response to the prompt.

2. The photographing method according to claim 1, further comprising: after receiving the confirmation message, automatically starting the front-facing camera to collect an image and displaying a photographing user interface corresponding to the front-facing camera when it is determined that the mobile phone changes from a first posture to a second posture for a second time.

3. The photographing method according to claim 1, further comprising: remaining the front-facing camera not started when no confirmation message is received; and remaining the front-facing camera not started when it is determined that the mobile phone changes from a first posture to a second posture for a second time.

4. The photographing method according to claim 1, wherein the first posture is a posture of the mobile phone when it mobile phone is at a start point of a preset move track, and the second posture is a posture of the mobile phone when it mobile phone is at an ending point of the preset move track.

5. The photographing method according to claim 4, wherein the mobile phone further comprises a rear-facing camera, the method further comprising:
    receiving a preset operation from a user;
    in response, automatically starting the rear-facing camera to collect an image and displaying a photographing user interface corresponding to the rear-facing camera, the preset operation comprising any one of the following:

tapping the display screen of the mobile phone for a first preset quantity of times;

pressing a fingerprint sensor of the mobile terminal for a second preset quantity of times; or sliding on the display screen of the mobile terminal according to a preset track.

6. The photographing method according to claim 1, further comprising:

after starting the front-facing camera, automatically taking a photograph when an image presented on the photographing user interface correspond to the front-facing camera no longer shakes.

7. The photographing method according to claim 1, wherein the at least one of sensor comprise any one or any combination of the following: a gravity sensor or a gyroscope.

8. A mobile phone comprising at least one processor, a memory storing instructions, a display screen, a front-facing camera and at least one sensor, wherein the instructions are executed by the at least one processor to cause the mobile phone to perform:

displaying a standby user interface;

determining a posture of the mobile phone according to information obtained by the at least one sensor;

automatically starting the front-facing camera to collect an image and displaying a photographing user interface corresponding to the front-facing camera, when it is determined that the mobile phone changes from a first posture to a second posture, the second posture being a manner in which a long side of the display screen of the mobile phone is perpendicular to a ground, and the photographing user interface corresponding to the front-facing camera comprising a photographing button;

receiving a click on the photographing button; and in response to the click having been received, taking a photograph;

displaying a prompt to query a user whether to start the front-facing camera when it is determined that the mobile phone changes from a first posture to a second posture for a first time; and automatically starting the front-facing camera to collect an image and displaying a photographing user interface correspond to the front-facing camera after receiving a confirmation message from the user in response to the prompt.

9. The mobile phone according to claim 8, further wherein the instructions are executed by the at least one processor to cause the mobile phone to perform:

after receiving the confirmation message, automatically starting the front-facing camera to collect an image and displaying a photographing user interface corresponding to the front-facing camera when it is determined that the mobile phone changes from a first posture to a second posture for a second time.

10. The mobile phone according to claim 8, wherein the instructions are executed by the at least one processor to cause the mobile phone to perform:

remaining the front-facing camera not started when no confirmation message is received; and remaining the front-facing camera not started when it is determined that the mobile phone changes from a first posture to a second posture for a second time.

11. The mobile phone according to claim 8, wherein the first posture is a posture of the mobile phone when it mobile phone is at a start point of a preset move track, and the second posture is a posture of the mobile phone when it mobile phone is at an ending point of the preset move track.

12. The mobile phone according to claim 11, wherein the mobile phone further comprises a rear-facing camera and the instructions are executed by the at least one processor to cause the mobile phone to perform:

receiving a preset operation from a user;

in response to the preset operation having been received from the user, automatically starting the rear-facing camera to collect an image and displaying a photographing user interface correspond to the rear-facing camera, the preset operation comprising any one of the following:

tapping the display screen of the mobile phone for a first preset quantity of times;

pressing a fingerprint sensor of the mobile terminal for a second preset quantity of times; or sliding on the display screen of the mobile terminal according to a preset track.

13. The mobile phone according to claim 8, wherein the instructions are executed by the at least one processor to cause the mobile phone to perform:

after starting the front-facing camera, automatically taking a photograph when an image presented on the photographing user interface corresponding to the front-facing camera no longer shakes.

14. The mobile phone according to claim 8, wherein the at least one of sensor comprise any one or any combination of the following: a gravity sensor or a gyroscope.

* * * * *